US012424741B2

(12) United States Patent
Wang

(10) Patent No.: US 12,424,741 B2
(45) Date of Patent: Sep. 23, 2025

(54) ANTENNA, MANUFACTURING METHOD OF THE SAME AND ANTENNA SYSTEM

(71) Applicant: BOE TECHNOLOGY GROUP CO., LTD., Beijing (CN)

(72) Inventor: Xiyuan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/427,669

(22) Filed: Jan. 30, 2024

(65) Prior Publication Data

US 2024/0170840 A1 May 23, 2024

Related U.S. Application Data

(63) Continuation of application No. 17/264,282, filed as application No. PCT/CN2020/078597 on Mar. 10, 2020, now Pat. No. 11,942,693.

(51) Int. Cl.

*H01Q 3/26* (2006.01)
*H01Q 3/36* (2006.01)
*H01Q 9/04* (2006.01)
*H01Q 21/06* (2006.01)

(52) U.S. Cl.

CPC ............... *H01Q 3/267* (2013.01); *H01Q 3/36* (2013.01); *H01Q 9/0407* (2013.01); *H01Q 21/065* (2013.01)

(58) Field of Classification Search

CPC ........ H01Q 3/267; H01Q 3/36; H01Q 9/0407; H01Q 21/065

USPC ........................................................ 342/367

See application file for complete search history.

(56) References Cited

U.S. PATENT DOCUMENTS

| | | | |
|---|---|---|---|
| 6,366,238 | B1 | 4/2002 | DeMore et al. |
| 9,923,269 | B1 | 3/2018 | Hageman et al. |
| 2014/0266897 | A1 | 9/2014 | Jakoby et al. |
| 2021/0118828 | A1 | 4/2021 | Franson et al. |

FOREIGN PATENT DOCUMENTS

| | | | |
|---|---|---|---|
| CN | 103326115 | A | 9/2013 |
| CN | 103975483 | A | 8/2014 |
| CN | 108172976 | A | 6/2018 |

(Continued)

OTHER PUBLICATIONS

Schollhorn, C. et al., "Attenuation mechanisms of aluminum millimeter-wave coplanar waveguides on silicon," IEEE Transactions on Electron Devices, vol. 50, No. 3, Mar. 2003, 7 pages.

(Continued)

*Primary Examiner* — Harry K Liu

(74) *Attorney, Agent, or Firm* — McCoy Russell LLP

(57) ABSTRACT

An antenna, a manufacturing method of the antenna, and an antenna system are provided. The antenna includes a radiation unit, configured to receive a microwave signal from outside and/or send a microwave signal to the outside; a phase shifting unit, configured to receive a plurality of amplified microwave signal and perform phase adjustment on the plurality of amplified microwave signals; and a power division and transmission unit, configured to combine a plurality of phase-adjusted microwave signals outputted by the phase shifting unit into a microwave signal and output the microwave signal.

19 Claims, 7 Drawing Sheets

(56) References Cited

FOREIGN PATENT DOCUMENTS

| | | | | | |
|---|---|---|---|---|---|
| CN | 110137636 | A | | 8/2019 | |
| CN | 110571537 | A | * | 12/2019 | |
| CN | 110785891 | A | * | 2/2020 | ......... H01Q 21/0031 |
| CN | 210040565 | U | | 2/2020 | |
| EP | 2575211 | A1 | * | 4/2013 | ............... H01Q 1/38 |
| EP | 3823088 | A1 | | 5/2021 | |
| JP | 4689493 | B2 | | 5/2011 | |

OTHER PUBLICATIONS

Vaccaro, S. et al., "Low cost phased array for mobile Ku-band satellite terminal," Proceedings of the Fourth European Conference on Antennas and Propagation, Apr. 12, 2010, Barcelona, Spain, 5 pages.
Li, Y. et al., "A Low Profile Wide-angle Scan Phased Array Antenna with Tile Architecture," Proceedings of the 2017 International Applied Computational Electromagnetics Society Symposium (ACES), Aug. 1, 2017, Suzhou, China, 2 pages.
ISA China National Intellectual Property Administration, International Search Report and Written Opinion Issued in Application No. PCT/CN2020/078597, Dec. 8, 2020, WIPO, 14 pages.
United States Patent and Trademark Office, Non-Final Office Action Issued in U.S. Appl. No. 17/264,282, Aug. 16, 2023, 16 pages.
European Patent Office, Extended European Search Report Issued in Application No. 20897677.9, Nov. 9, 2023, Germany, 14 pages.
United States Patent and Trademark Office, Notice of Allowance Issued in U.S. Appl. No. 17/264,282, Nov. 24, 2023, 7 pages.

* cited by examiner

ANTENNA, MANUFACTURING METHOD OF THE SAME AND ANTENNA SYSTEM

CROSS REFERENCE TO RELATED APPLICATION

The present application is a continuation of a U.S. patent application Ser. No. 17/264,282 filed on Jan. 28, 2021, which is a U.S. National Phase of International Application No. PCT/CN2020/078597 entitled "ANTENNA, MANUFACTURING METHOD OF THE SAME AND ANTENNA SYSTEM," and filed on Mar. 10, 2020. The entire contents of each of the above-listed applications are hereby incorporated by reference for all purposes.

TECHNICAL FIELD

The present disclosure relates to the field of antenna technology, and in particular, relates to an antenna, a manufacturing method of the antenna, and an antenna system.

BACKGROUND AND SUMMARY

In liquid crystal phased array antennas with a liquid crystal phase shifter being used as a core device, a loss, caused by a liquid crystal material, of a microwave signal is relatively high, which causes an overall gain-to-noise temperature ratio of the antennas to decrease, and results in a poor performance of the antennas. Embodiments of the present disclosure provide an antenna, a manufacturing method of the antenna, and an antenna system.

In an aspect, an antenna is provided, the antenna includes: a radiation unit, configured to receive a microwave signal from outside and/or send a microwave signal to the outside; an active amplifying unit, configured to receive a plurality of microwave signals inputted by the radiation unit and amplify the plurality of microwave signals; a phase shifting unit, configured to receive a plurality of amplified microwave signals outputted by the active amplifying unit and perform phase adjustment on the plurality of amplified microwave signals; and a power division and transmission unit, configured to combine a plurality of phase-adjusted microwave signals outputted by the phase shifting unit into a microwave signal and output the microwave signal.

In some embodiments, the antenna further includes: a microwave connection unit, between the radiation unit and the active amplifying unit and configured to transmit the plurality of microwave signals outputted by the radiation unit to the active amplifying unit through a conductor.

In some embodiments, the radiation unit includes one patch structure or a plurality of patch structures, the one patch structure or each of the plurality of patch structures includes a substrate and a plurality of metal patch arrays disposed on a surface of the substrate at one side of the substrate, and each of the plurality of metal patch arrays includes a plurality of metal patterns disposed in an array; a first patch structure adjacent to the active amplifying unit further includes at least one power divider, and each of the at least one power divider is connected to at least one of the plurality of metal patch arrays.

In some embodiments, a distance between adjacent metal patch arrays is not less than 0.5λ, and λ is a width of each of the plurality of metal patch arrays.

In some embodiments, when the radiation unit includes the plurality of patch structures, the plurality of patch structures are stacked, and adjacent patch structures are connected by prepregs or adhesive insulating spacers.

In some embodiments, the radiation unit includes a first patch structure and a second patch structure stacked with the first patch structure, a plurality of first metal patch arrays is arranged on the first patch structure, a plurality of second metal patch arrays is arranged on the second patch structure, and the plurality of first metal patch arrays correspond to the plurality of second metal patch arrays in a one-to-one manner.

In some embodiments, each of the plurality of first metal patch arrays includes a plurality of first metal patterns disposed in an array, each of the plurality of second metal patch arrays includes a plurality of second metal patterns disposed in an array, the plurality of first metal patterns correspond to the plurality of second metal patterns in a one-to-one manner, and an orthographic projection of a center of each of the plurality of first metal patterns on a substrate of the second patch structure coincides with a center of a corresponding second metal pattern.

In some embodiments, the substrate is a printed circuit board.

In some embodiments, the active amplifying unit includes a plurality of active amplifying circuits, and each of the plurality of active amplifying circuits includes: a radio frequency signal input terminal, configured to receive a microwave signal; a filter, connected to the radio frequency signal input terminal and configured to filter noise of an input microwave signal; at least one amplifier, connected to the filter and configured to amplify an intensity of a microwave signal; at least one attenuator, connected to an amplifier and configured to attenuate an intensity of a microwave signal; a radio frequency signal output terminal, connected to an attenuator and configured to transmit a microwave signal to the phase shifting unit in a spatial coupling manner.

In some embodiments, when the antenna includes the microwave connection unit, the microwave connection unit includes a plurality of microwave connectors, each of the plurality of microwave connectors includes a second male head and a first female head connected to each other; the first female head is connected to a first male head of a power divider of the first patch structure in a one-to-one correspondence, and the second male head is connected to a second female head of an active amplifier circuit in a one-to-one correspondence.

In some embodiments, the phase shifting unit is a liquid crystal phase shifter.

In some embodiments, the power division and transmission unit includes: a power divider, configured to combine, into N microwave signals, M phase-adjusted microwave signals outputted by M phase shifting units, and output the N microwave signals to a waveguide, wherein M and N are integers greater than 1, and M is greater than N; a waveguide, configured to combine the N microwave signals into a microwave signal and output the microwave signal.

In some embodiments, the power divider includes a metal ground electrode corresponding to the phase shift unit in a one-to-one manner, and the metal ground electrode is provided with a coupling groove configured to couple a microwave signal between the phase shifting unit and the coupling groove; M metal ground electrodes are divided into N groups, and each group of metal ground electrodes is connected to a probe through a wire; the waveguide includes N hollow waveguide cavities corresponding to probes in a one-to-one manner, the probe is inserted into a corresponding waveguide cavity, the N hollow waveguide cavities are communicated to form an integrated structure, and the integrated structure is provided with an opening, and a signal output terminal is disposed at the opening.

In some embodiments, the waveguide is an aluminum waveguide.

The embodiments of the present disclosure further provide an antenna system, the antenna system includes the antenna provided above.

The embodiments of the present disclosure further provide a method of manufacturing an antenna, the method includes: providing a radiation unit, the radiation unit being configured to receive a microwave signal from outside and/or send a microwave signal to the outside; providing an active amplifying unit, the active amplifying unit being configured to receive a plurality of microwave signals inputted by the radiation unit, and amplify the plurality of microwave signals; providing a phase shifting unit, the phase shifting unit being configured to receive a plurality of amplified microwave signals outputted by the active amplifying unit, and perform phase adjustment on the plurality of amplified microwave signals; and providing a power division and transmission unit, the power division and transmission unit being configured to combine, into a microwave signal, a plurality of phase-adjusted microwave signals outputted by the phase shifting unit and output the microwave signal; assembling the radiation unit, the active amplifying unit, the phase shifting unit and the power division and transmission unit together in sequence.

In some embodiments, the method further includes: forming a microwave connection unit between the radiation unit and the active amplifying unit, wherein the microwave connection unit is configured to transmit, to the active amplifying unit through a conductor, the plurality of microwave signals outputted by the radiation unit.

REFERENCE NUMERALS

Figure 1:
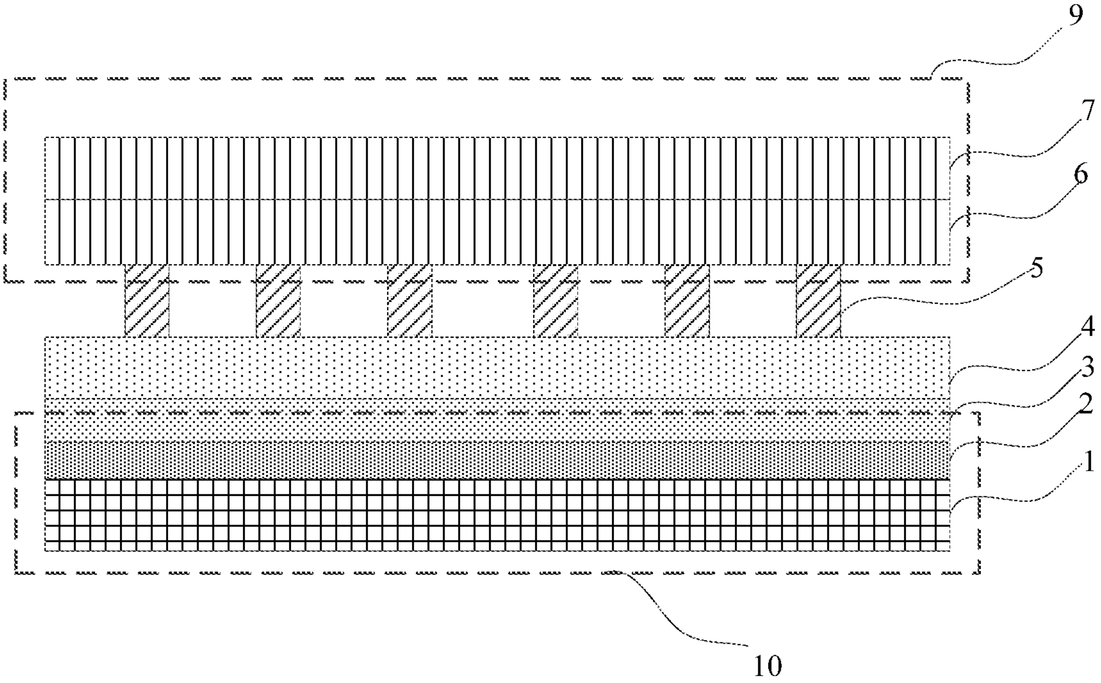
FIG. 1 is a structural schematic diagram of an antenna according to embodiments of the present disclosure.

1 waveguide
11 first substrate
12 waveguide cavity
13 signal output terminal
2 power divider
21 second substrate
22 probe
23 metal ground electrode of power divider
24 wiring
3 phase shifting unit
31 third substrate
32 fourth substrate
33 metal ground electrode of phase shifting unit
34 metal delay line of phase shifting unit
35 liquid crystal layer
36 second alignment film
37 first alignment film
4 active amplifying unit
41 fifth substrate
42 active amplifying circuit
43 second female head
45 via hole
46 metal wire
47 radio frequency signal input terminal
48 radio frequency signal output terminal
5 microwave connection unit
51 first female head
52 second male head
6 first patch structure
61 sixth substrate
62 first metal pattern
63 first male head
7 second patch structure
71 seventh substrate
72 second metal pattern
8 insulating spacer
9 radiation unit
10 power division and transmission unit

DETAILED DESCRIPTION

To make technical problems to be solved, technical solutions and advantages of embodiments of the present disclosure clearer, a detailed description of the present disclosure will be given below in conjunction with drawings and the embodiments of the present disclosure.

Embodiments of the present disclosure provide an antenna, a method of manufacturing the antenna, and an antenna system, which may increase a gain-to-noise temperature ratio.

Embodiments of the present disclosure provide an antenna, as shown in FIG. 1, The antenna includes: a radiation unit 9, configured to receive a microwave signal from the outside and/or send a microwave signal to the outside; an active amplifying unit 4, configured to receive a plurality of microwave signals inputted by the radiation unit 9 in a plurality of paths and amplify the plurality of microwave signals; a phase shifting unit 3, configured to receive a plurality of amplified microwave signals outputted by the active amplifying unit 4 in the plurality of microwave signals and perform phase adjustment on the plurality of amplified microwave signals; and a power division and transmission unit 10, configured to combine a plurality of phase-adjusted microwave signals outputted by the phase shifting unit 3 into a microwave signal and output the microwave signal.

In the embodiments, after the radiation unit receives a microwave signal from the outside and before transmitting the microwave signal to the phase shifting unit, the active amplifying unit is configured to amplify the microwave signal, which can compensate for loss of the microwave signal after entering the phase shifting unit, and can effectively increase a gain of an antenna, thereby increasing the gain-to-noise temperature ratio of the antenna and improving performance of the antenna.

If the microwave signal collected by the radiation unit 9 is transmitted to the active amplifying unit 4 through spatial coupling, there will be transmission loss, and alignment accuracies between the radiation unit 9 and the active amplifying unit 4 are relatively high. In some embodiments, in order to reduce the transmission loss and alignment errors, as shown in FIG. 1, the antenna further includes: a microwave connection unit 5, located between the radiation unit 9 and the active amplifying unit 4 and configured to transmit the plurality of microwave signals outputted by the radiation unit 9 to the active amplifying unit 4 through a conductor.

The microwave connection unit 5 can reliably input, to the active amplifying unit 4, the microwave signal collected by the radiation unit 9, which can reduce transmission loss and alignment errors, and the microwave connection unit 5 can also provide support for the radiation unit 9.

The radiation unit 9 includes at least one patch structure. The radiation unit 9 may include one patch structure or a plurality of patch structures. When the radiation unit 9 includes a plurality of patch structures, the gain of the antenna can be increased, and a bandwidth of the antenna can be expanded, but at the same time this will increase structural complexity and a cost of the antenna. In some embodiments, as shown in FIG. 1, the radiation unit 9 may include two patch structures, i.e., a first patch structure and a second patch structure, where the second patch structure is located on an outermost side of the antenna.

Each of the at least one patch structure includes a substrate and a plurality of metal patch arrays disposed on a surface of the substrate at one side, and each of the plurality of metal patch arrays includes a plurality of metal patterns disposed in an array.

Figure 2:
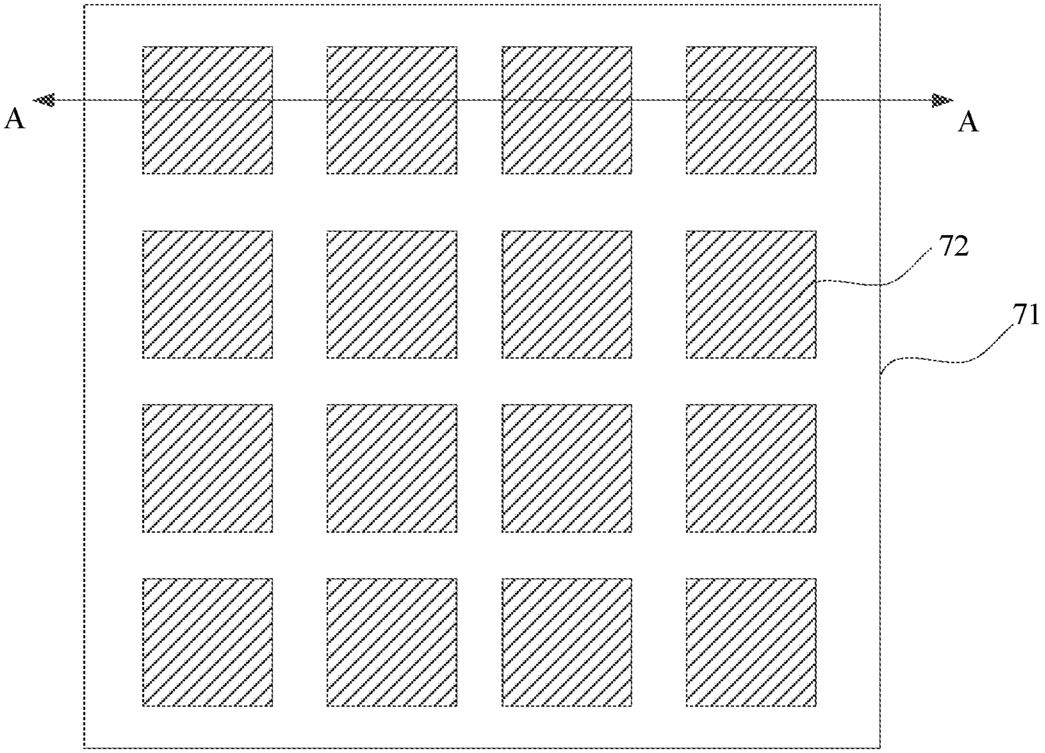
FIG. 2 is a schematic plan view of a second patch structure according to embodiments of the present disclosure.

As shown in FIG. 2, a second patch structure 7 includes a seventh substrate 71 and a plurality of metal patch arrays arranged in an array on the seventh substrate 71, and each metal patch array includes a plurality of second metal pattern 72 arranged in an array, where the seventh substrate 71 may be a PCB board, and a thickness of the seventh substrate may be 0.5 mm to 6.4 mm. The second metal patterns 72 may be made of a metal with good electrical conductivity, such as copper, aluminum, etc., and a thickness of the second metal pattern 72 may be 17 um, 35 um, 50 um, 70 um, etc.

In some embodiments, a metal patch array may be approximately square, and the second metal pattern 72 may also be approximately square. In order to avoid mutual interference between adjacent metal patch arrays, a distance between adjacent metal patch arrays is not less than 0.5λ, where λ is a width of each of the plurality of metal patch arrays.

Figure 3:
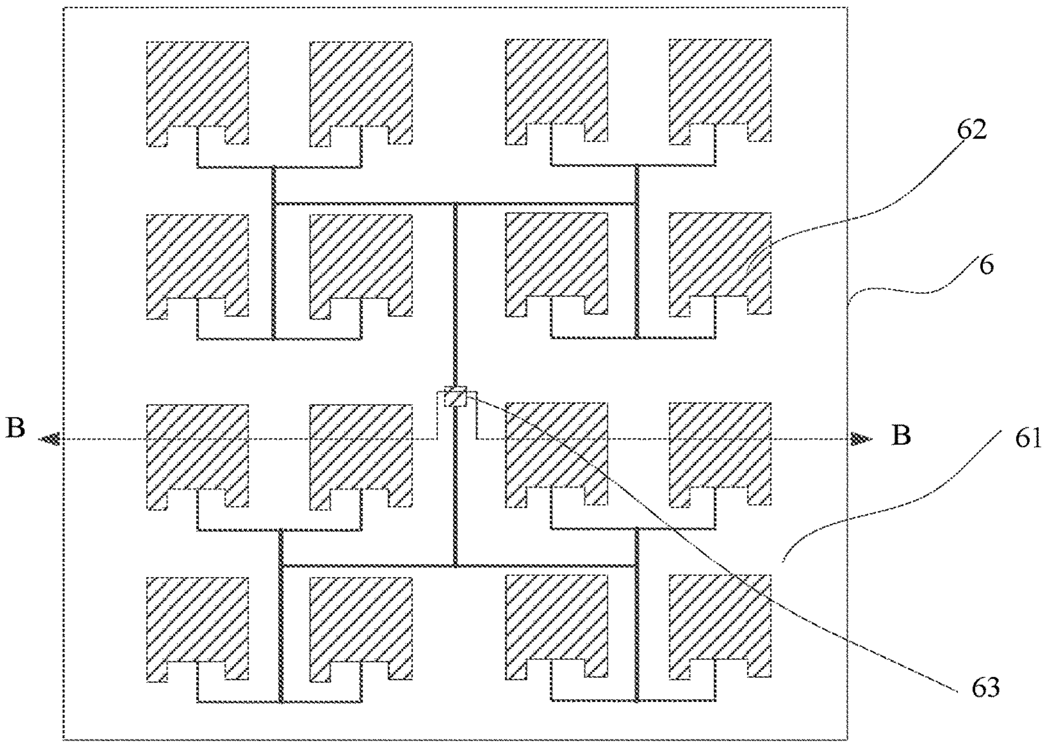
FIG. 3 is a schematic plan view of a first patch structure according to embodiments of the present disclosure.

As shown in FIG. 3, a first patch structure 6 includes a sixth substrate 61 and a plurality of metal patch arrays arranged in an array on the sixth substrate 61. Metal patch arrays of the first patch structure 6 can correspond to metal patch arrays of the second patch structure 7 in a one-to-one manner. Each metal patch array includes a plurality of first metal patterns 62 arranged in an array.

The sixth substrate 61 may be a PCB board, and a thickness of the sixth substrate may be 0.5 mm to 6.4 mm. The first metal pattern 62 may be made of metals with good electrical conductivity, such as copper, aluminum, etc., and a thickness of the first metal pattern 62 may be 17 um, 35 um, 50 um, 70 um, etc.

In some embodiments, metal patch arrays may be approximately square, and the first metal pattern 62 may also be approximately square. In order to avoid mutual interference between adjacent metal patch arrays, a distance between adjacent metal patch arrays is not less than 0.5λ, where k is a width of each of the plurality of metal patch arrays.

In the embodiments, the plurality of first metal patterns 62 correspond to the plurality of second metal patterns 72 in a one to one manner, and an orthographic projection of a center of a first metal pattern 62 on a substrate of the second patch structure 7 coincides with a center of a corresponding second metal pattern.

In the embodiments, the first metal pattern 62 and the second metal pattern 72 can be a square or a square with a notch on a side. By adjusting shapes of the first metal pattern 62 and the second metal pattern 72, and adjusting distances between the first patch structure 6 and the second patch structure 7, a receiving frequency of the antenna can be adjusted.

When the sixth substrate 61 and the seventh substrate 71 are both PCB boards, since the PCB boards are opaque, alignment holes need to be provided on the sixth substrate 61 and the seventh substrate 71 to position and fix the patch structures.

The first patch structure 6 close to the active amplifying unit 4 further includes at least one power divider, and each of the at least one power divider corresponds to at least one metal patch array. A power divider is connected to the first metal pattern 62 in the corresponding metal patch array, and collects and output, to a signal output terminal, microwave signals collected by a connected first metal pattern 62, and each power divider corresponds to a signal output terminal. As shown in FIG. 3, the signal output terminal may be a first male head 63.

Figure 4:
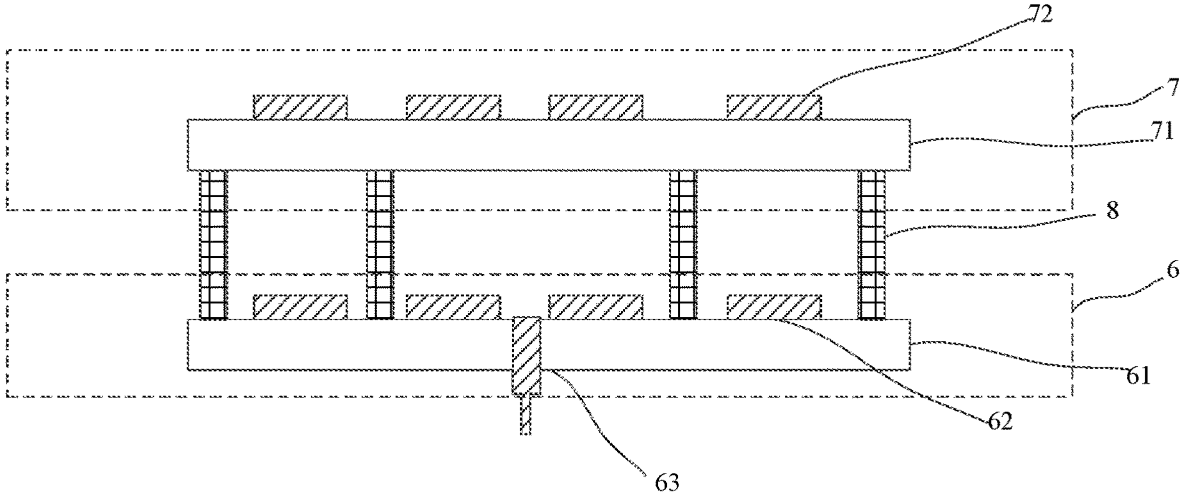
FIG. 4 is a schematic cross-sectional view of a first patch structure and a second patch structure according to embodiments of the present disclosure.

When the radiation unit 9 includes a plurality of patch structures, the plurality of patch structures are stacked, and adjacent patch structures are connected by prepregs. Optionally, as shown in FIG. 4, the first patch structure 6 and the second patch structure 7 can be connected by an adhesive insulating spacer 8. The insulating spacer 8 may be made of an adhesive glue with a certain hardness after curing, such as an optical glue OCA. Specifically, a distance between the first patch structure 6 and the second patch structure 7 can be adjusted according to a designed receiving frequency of the antenna.

The first patch structure 6 in FIG. 4 is in a schematic cross-sectional view of the first patch structure 6 shown in FIG. 3 in a BB direction; the second patch structure 7 in FIG. 4 is in a schematic cross-sectional view of the second patch structure 7 shown in FIG. 2 in an AA direction. As shown in FIG. 4, the first male head 63 extends to a side of the sixth substrate 61 away from the seventh substrate 71 through a via hole penetrating through the sixth substrate 61. The via hole may be a metalized via hole, that is, a sidewall of the via hole is plated with metal, such as copper. The sidewall can be first chemically plated with copper with a thickness of 300 nm to 1000 nm, and then thickened by electroplating, so that a thickness of copper after the thickening can reach 5 um to 25 um.

In a specific example, the second patch structure 7 may include an array of 32×32 metal patches, the first patch structure 6 may include an array of 32×32 metal patches, and the power divider of the first patch structure 6 a is T-type or Wilkinson-type 16-in-1 power divider, that is, each power divider is connected to an array of 4×4 metal patches, so that the first patch structure 6 will output 8×8 microwave signals through the first male head 63 of 64 power dividers.

Figure 5:
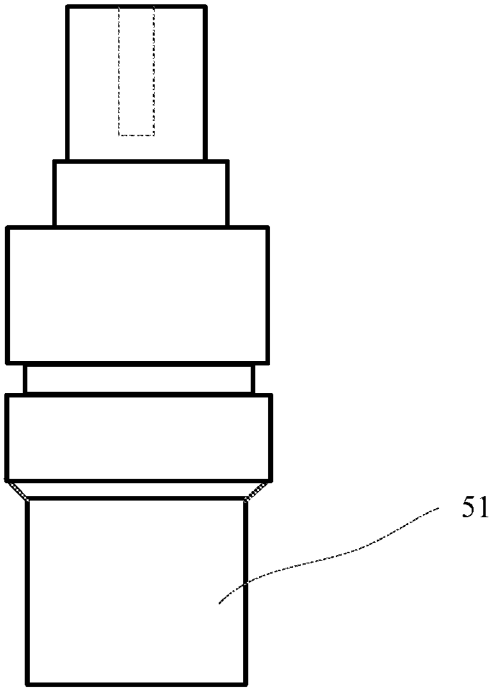
FIG. 5 is a structural schematic diagram of a first female head of a microwave connector according to embodiments of the present disclosure.
Figure 6:
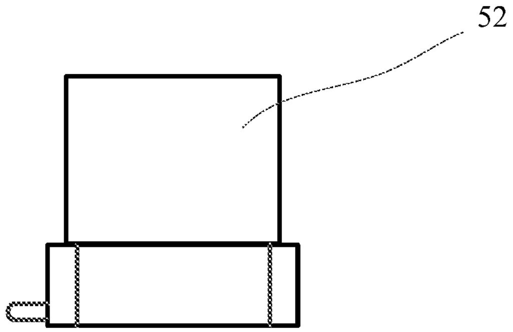
FIG. 6 is a structural diagram of a second male head of a microwave connector according to embodiments of the present disclosure.

The microwave connection unit includes a plurality of microwave connectors, each microwave connector includes a second male head 52 and a first female head 51 that are connected to each other. A structure of the first female head 51 is shown in FIG. 5, the first female head 51 is connected to the first male head 63 of the power divider of the first patch structure 6 in a one-to-one correspondence. The structure of the second male head 52 is shown in FIG. 6, the second male head is connected to the active amplifier unit 4. When the first patch structure 6 includes 64 first male heads 63 and outputs 8×8 microwave signals, the microwave connection unit 5 includes 8×8 microwave connectors.

Figure 7:
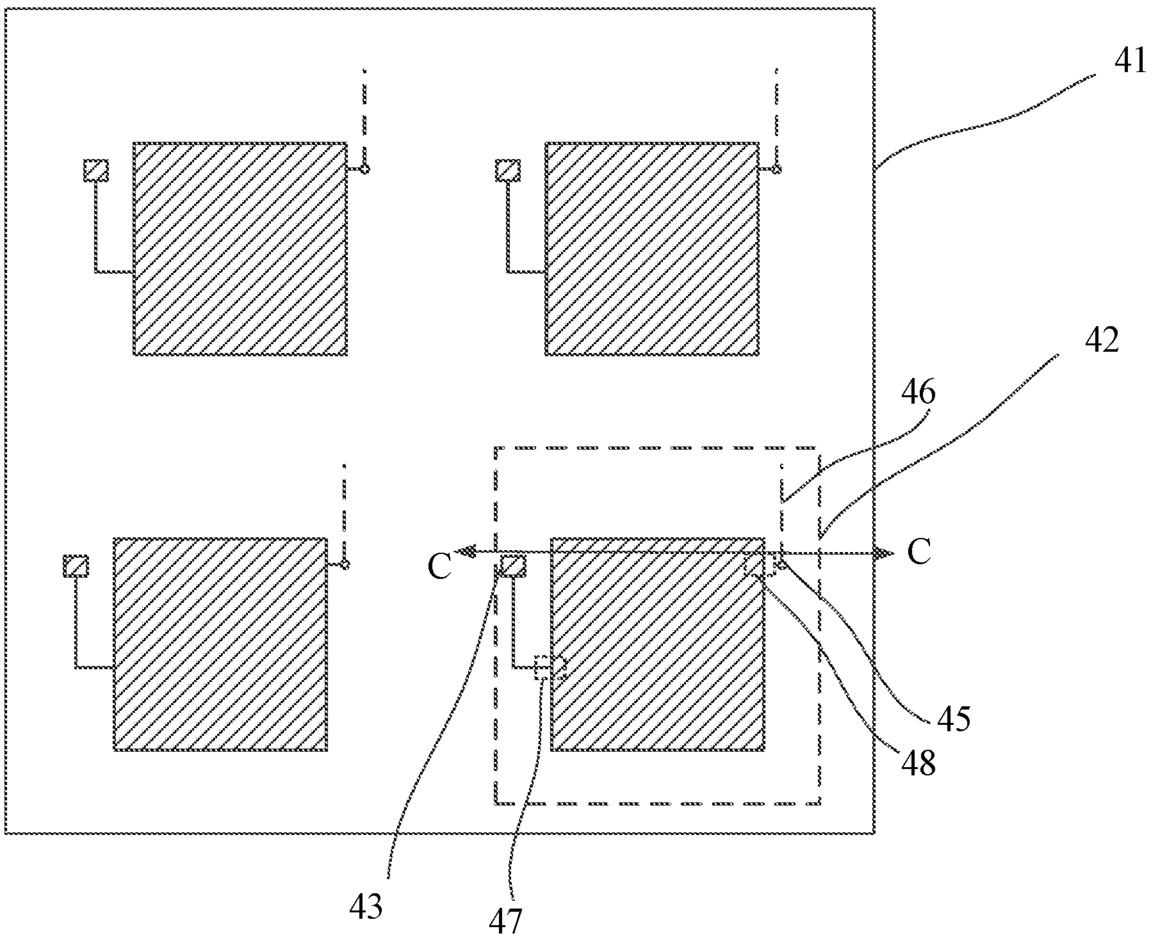
FIG. 7 is a schematic plan view of an active amplifying unit according to embodiments of the present disclosure.

As shown in FIG. 7, the active amplifying unit 4 includes a fifth substrate 41 and a plurality of active amplifying circuits 42 arranged in an array on the fifth substrate 41, and the active amplifying circuits 42 correspond with the microwave connectors in a one to one manner. Each active amplifying circuit includes: a radio frequency signal input terminal 47, configured to receive a microwave signal; a filter, connected to the radio frequency signal input terminal and configured to filter noise of an input microwave signal; at least one amplifier, connected to the filter and configured to amplify an intensity of the microwave signal; at least one attenuator, connected to the amplifier and configured to attenuate an intensity of the microwave signal; a radio frequency signal output terminal 48, connected to the attenuator and configured to transmit the microwave signal to the phase shifting unit 3 in a spatial coupling manner.

In some embodiments, each active amplifying circuit includes two stages of low noise amplifiers and several stages of attenuators. By adjusting amplification coefficients of the amplifiers and attenuation coefficients of the attenuators, an intensity of the microwave signal outputted by a radio frequency signal output terminal 48 can be controlled. Optionally, intensities of microwave signals outputted by all the radio frequency signal output terminals 48 are basically the same.

When the microwave connection unit 5 includes 8×8 microwave connectors, correspondingly, the active amplifying unit 4 includes 8×8 active amplifying circuits.

As shown in FIG. 7, the active amplifying circuit 42 includes a second female head 43, the second female head 43 is connected to the second male head 52 in a one-to-one correspondence, receives a microwave signal outputted by the second male head 52, and transmits the microwave signal to the radio frequency signal input terminal 47 through a metal wire. After the active amplifier circuit 42 amplifies the microwave signal, an amplified microwave signal is outputted through the radio frequency signal output terminal 48. The microwave signal outputted from the radio frequency signal output terminal 48 is led out by the metal wire 46. The metal wire 46 extends to a back surface of the fifth substrate 41 through a via hole 45 penetrating through the fifth substrate 41.

Figure 8:
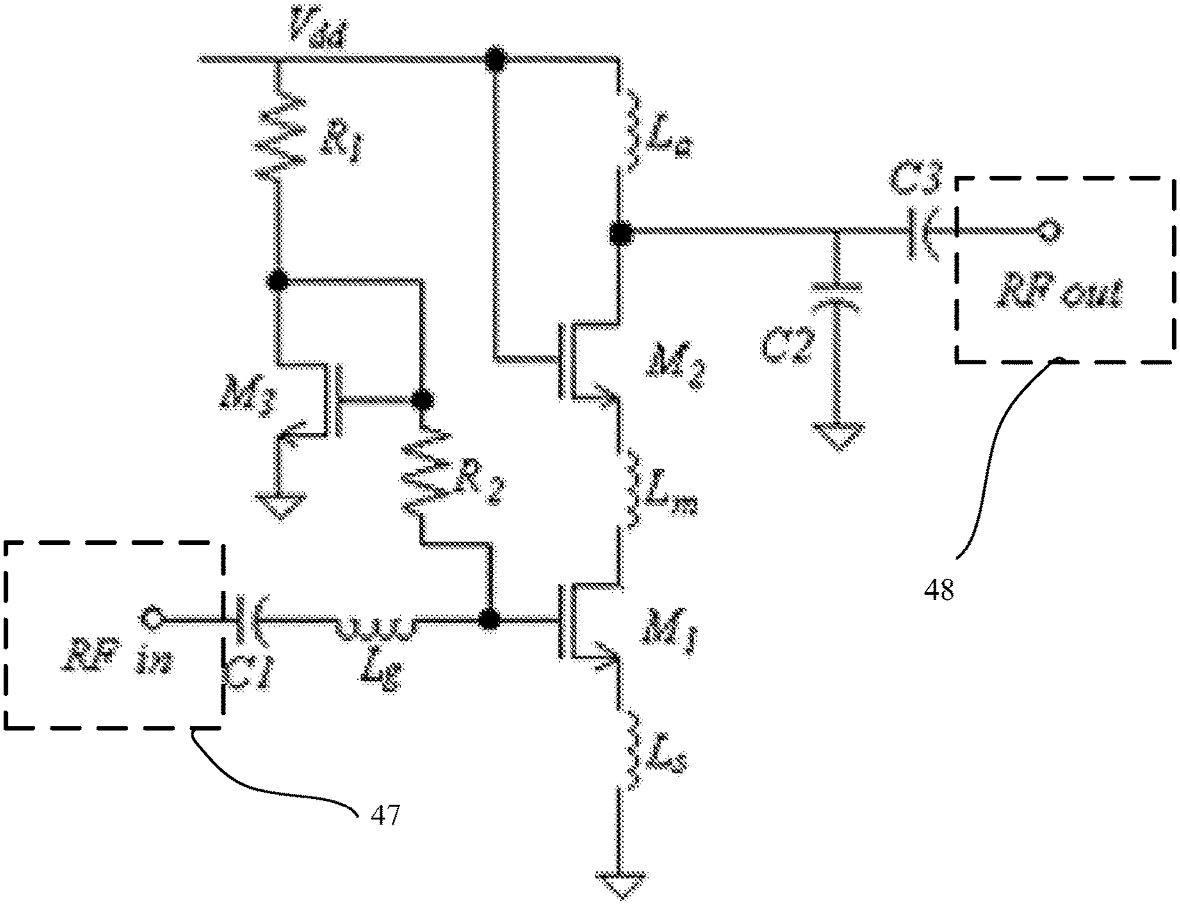
FIG. 8 is a schematic diagram of an active amplifying circuit according to embodiments of the present disclosure.

FIG. 8 is a circuit schematic diagram of an active amplifier circuit 42, where Vdd is a direct current supply voltage; $R_1$, $R_2$ are matching resistances; La, Lm, Ls, and Lg are matching inductances; $C_1$, $C_2$, $C_3$ are matching capacitors; $M_1$, $M_2$, $M_3$ are microwave transistors; $M_2$ and $M_3$ are amplifiers, La, Lm, and Ls are attenuators, and Lg and $C_1$ form a filter. The fifth substrate 41 may be a PCB board, and the second female head 43, the above-mentioned capacitors, inductors, resistors and other components may be welded on the PCB board by a reflow soldering process.

Figure 9:
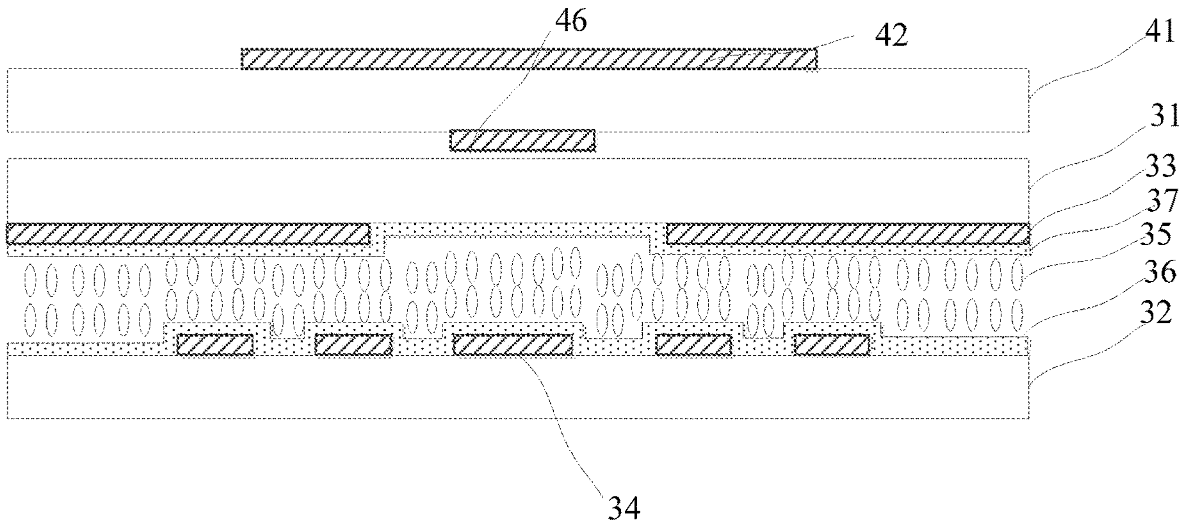
FIG. 9 is a schematic cross-sectional view of an active amplifying circuit and a phase shifting unit according to embodiments of the present disclosure.

In some embodiments, the phase shifting unit 3 may be a liquid crystal phase shifter. As shown in FIG. 9, the liquid crystal phase shifter includes a third substrate 31 and a fourth substrate 32 disposed oppositely, a metal ground electrode 33 of the liquid crystal phase shifter is provided on a surface of the third substrate 31 facing the fourth substrate 32, and a metal delay line 34 of the liquid crystal phase shifter is provided on a surface of the fourth substrate 32 facing the third substrate 31. The liquid crystal phase shifter further includes a first alignment film 37 disposed on a surface of the third substrate 31 facing the fourth substrate 32, a second alignment film 36 disposed on a surface of the fourth substrate 32 facing the third substrate 31 and a liquid crystal layer 35 located between the first alignment film 37 and the second alignment film 36. A coupling groove of the metal ground electrode 33 can be rectangular, H-shaped, bone-shaped, etc., and a thickness of the metal ground electrode 33 can be 0.5 um to 5 um; the metal delay line 34 can be made of copper and arranged in a serpentine winding manner, a line width of the metal delay line is 100 um to 250 um, a line distance is 150 um to 400 um, and a thickness is 0.5 um to 5 um. Further, the liquid crystal phase shifter includes a bias line layer, which can be made of ITO, a line width of the bias line layer is 3 um to 20 um, and a thickness of the bias line layer is 30 nm to 150 nm.

As shown in FIG. 9, the metal wire 46 is used as a coupling transmission line, and spatial coupling of a waveform signal is implemented by the metal delay line 34 and a coupling groove (an area defined by the metal ground electrode 33) on the liquid crystal phase shifter. The active amplifying circuit 42 in FIG. 9 is shown as a schematic cross-sectional view of the active amplifying circuit in FIG. 7 in a CC direction. In order to ensure transmission of the microwave signal, an orthographic projection of the metal wire 46 on the third substrate 31 falls within an orthographic projection of the coupling groove of the metal ground electrode 33 on the third substrate 31, and an orthographic projection of a central axis of the metal wire 46 on the third substrate 31 coincides with an orthographic projection of a central axis of the coupling groove of the metal ground electrode 33 on the third substrate 31.

In the embodiments, a microwave signal outputted by the first patch structure 6 passes through a connection between the first male head 63 and the first female head 51, a connection between the first female head 51 and the second male head 52, and a connection between the second male head 52 and the second female connector 43, and enters into the radio frequency signal input terminal 47, and is amplified by the active amplifier circuit. An amplified microwave signal is transmitted to the metal wire 46 on the back side of the fifth substrate 41 through the radio frequency signal output terminal 48, and coupling of the microwave signal is implemented from the metal wire 46 to the metal delay line 34 in the phase shift unit 3 below. The microwave signal passes through the fourth substrate 32, the metal ground electrode 33 and a liquid crystal in a spatial coupling manner, and reaches the metal delay line 34. In the embodiment, feeding between the active amplifier circuit 42 and the liquid crystal phase shifter are implemented in a coupling manner, which can avoid complicated processes such as punching and copper-filling processes on a substrate of the liquid crystal phase shifter, simplify a manufacturing process and reduce process complexity.

In the embodiment, the phase shifting unit 3 corresponds to the active amplifying circuit 42 in a one-to-one manner.

When the active amplifying unit 4 includes 8×8 active amplifying circuits, the antenna includes 8×8 phase shifting units 3.

In some embodiments, as shown in FIG. 1, the power division and transmission unit includes: a power divider 2, configured to combine, into N microwave signals, M phase-adjusted microwave signals outputted by M phase shifting units, and output the N microwave signals to a waveguide, wherein M and N are integers greater than 1, and M is greater than N; a waveguide 1, configured to combine the N microwave signals into one microwave signal and output the microwave signal.

In a specific embodiment, when there are 8×8 phase shifting units 3, the power divider 2 can adopt a 16-in-1 power divider design. Specifically, the power divider 2 can adopt a Wilkinson-type or a T-type power divider. The 64 microwave signals are combined into 2×2 microwave signals.

Figure 10:
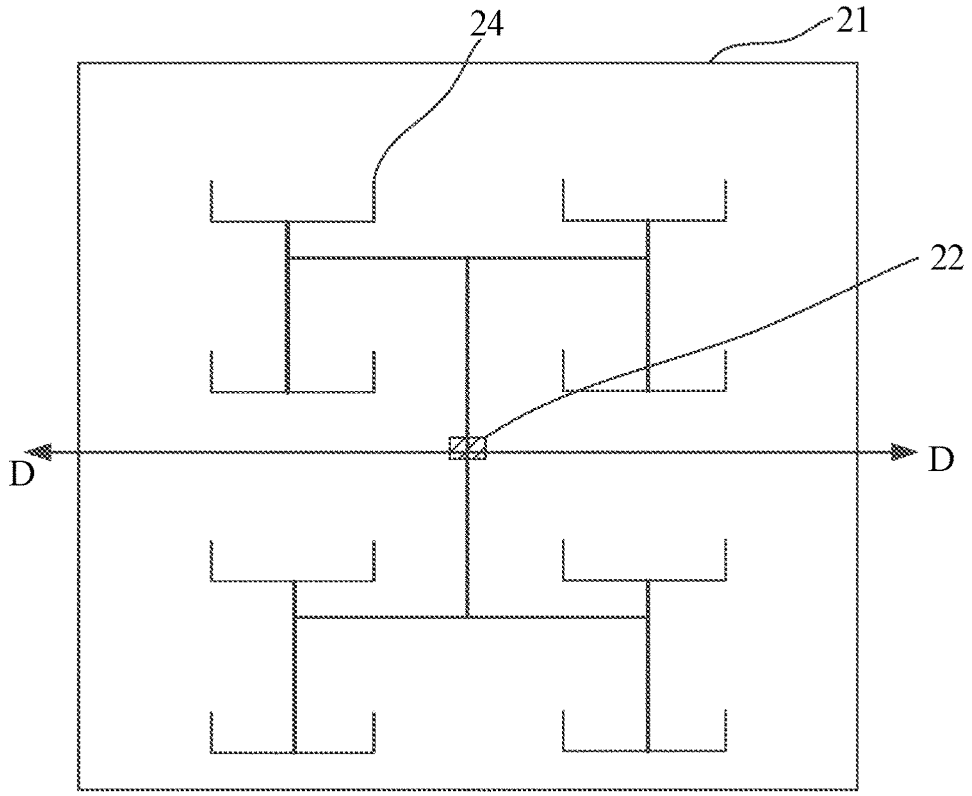
FIG. 10 is a schematic plan view of a power divider according to embodiments of the present disclosure.
Figure 12:
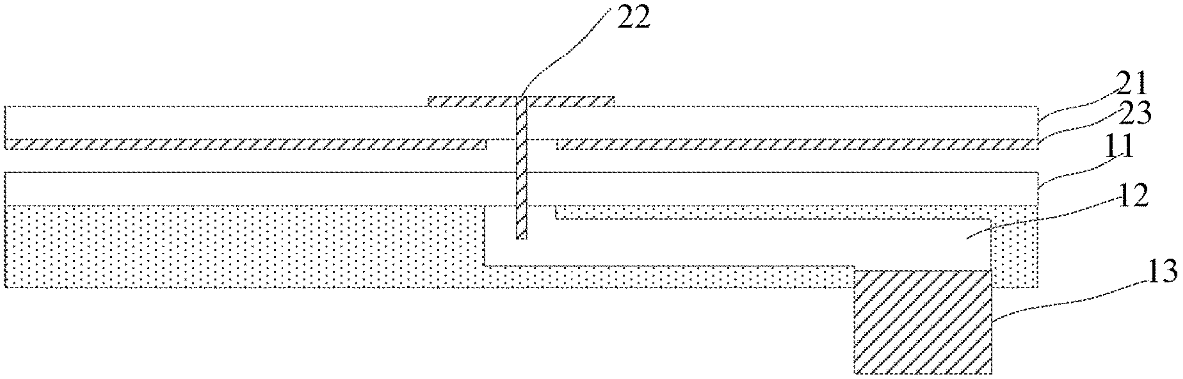
FIG. 12 is a schematic cross-sectional view of a power divider and a waveguide according to embodiments of the present disclosure.

Specifically, as shown in FIG. 10 and FIG. 12, the power divider 2 includes a metal ground electrodes 23 corresponding to the phase shifting unit in a one to one manner. The metal ground electrode is located on the second substrate 21, and the metal ground electrode 23 is further provided with a coupling groove, a microwave signal is coupled between the phase shifting unit 3 and the coupling groove. The M metal ground electrodes 23 are divided into N groups, and the metal ground electrodes 23 in each group are connected to a probe 22 through wirings 24 to collect M/N microwave signals to the probe 22; the probe 22 extends to a side of the second substrate 21 away from the phase shifting unit 3 through a via hole penetrating through the second substrate 21. The via hole may be a metalized via hole, that is, a sidewall of the via hole is plated with metal, such as copper. The sidewall can be first chemically plated with copper having a thickness of 300 nm to 1000 nm, and then thickened by electroplating copper, so that a thickness of the copper can reach 5 um to 25 um. A power divider 2 in FIG. 12 is in a schematic cross-sectional view of the power divider 2 in FIG. 10 in a DD direction.

The second substrate 21 of the power divider 2 can be a PCB board, a line width of the wiring 24 can be 80 um to 400 um, a thickness of the wiring 24 can be 17 um, a thickness of the metal ground electrode 23 can be 17 um, and an available form of the coupling groove can be rectangular, H type, bone type, etc.

When the antenna includes 8×8 phase shift units 3 and the power divider 2 adopts a 16-in-1 power divider design, the power divider 1 includes a total of four probes 22 for feeding the waveguide 1.

Figure 11:
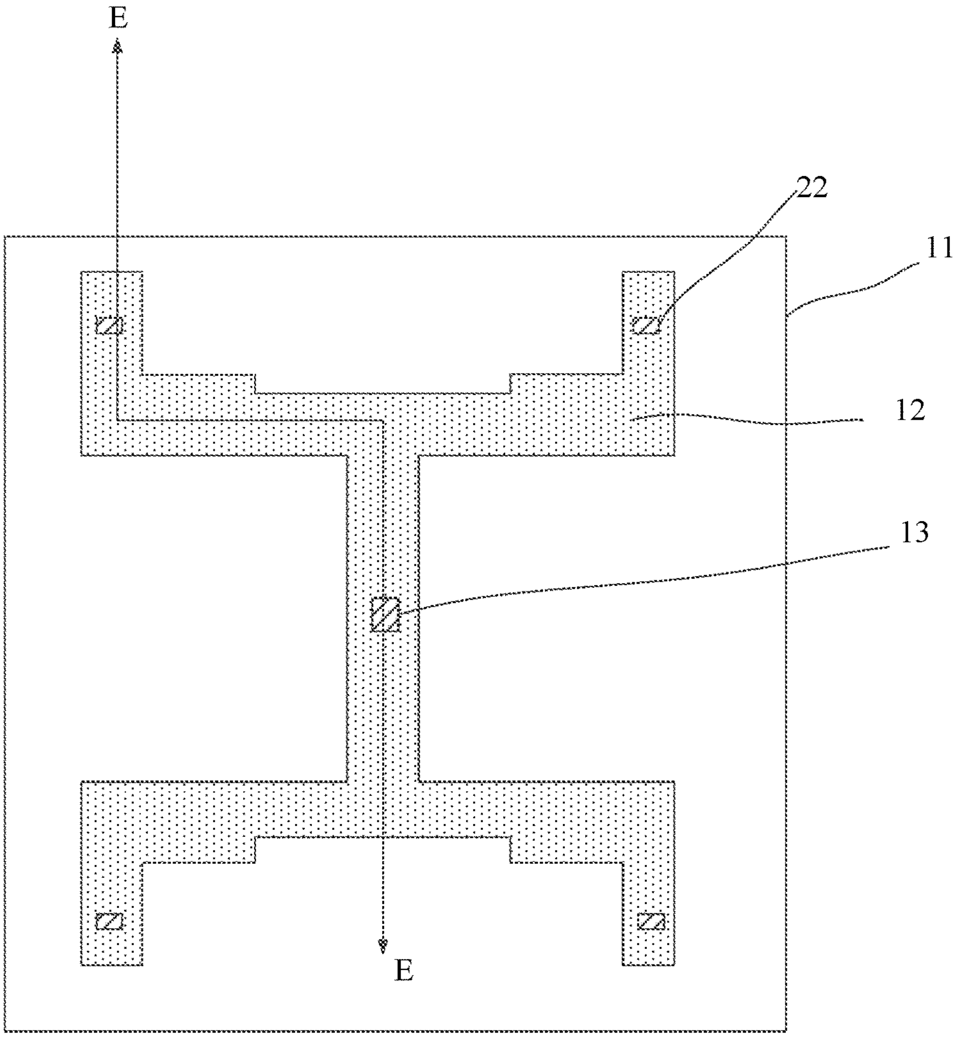
FIG. 11 is a schematic plan view of a waveguide according to embodiments of the present disclosure.

Specifically, as shown in FIG. 11 and FIG. 12, the waveguide 1 includes N hollow waveguide cavities 12 corresponding to the probes 22 in a one-to-one manner, a probe 22 is inserted into a corresponding waveguide cavity 12, the N hollow waveguide cavities 12 are communicated to form an integrated structure, and the integrated structure is provided with an opening, and a signal output terminal 13 is disposed at the opening. The signal output terminal 13 can output microwave signals. A waveguide 1 in FIG. 12 is in a schematic cross-sectional view of a waveguide 1 in FIG. 11 in an EE direction.

When the power splitter 1 includes four probes 22 in total, the waveguide 1 can combine four microwave signals into one microwave signal for output.

In some embodiments, the waveguide maybe an aluminum waveguide.

In the embodiment, the power divider transmission unit adopts a design including a PCB power divider and an aluminum waveguide, which combines an advantage of the PCB power divider in respect of easily-implemented planar processing and a characteristic of the aluminum waveguide in respect of an extremely low transmission loss, and can overcome a shortcoming of a single PCB power divider in respect of a high insertion loss and a shortcoming of a single aluminum waveguide in respect of difficult processes and high costs.

Embodiments of the present disclosure further provide an antenna system including the above-mentioned antenna. The antenna system can be used in a communication equipment.

Embodiments of the present disclosure further provide a method of manufacturing an antenna which is used to manufacture the above antenna. The method includes: providing a radiation unit, the radiation unit being configured to receive a microwave signal from the outside and/or send a microwave signal to the outside; providing an active amplifying unit, the active amplifying unit being configured to receive a plurality of microwave signals inputted by the radiation unit in a plurality of paths, and amplify the plurality of microwave signals; providing a phase shifting unit, the phase shifting unit being configured to receive a plurality of amplified microwave signals outputted by the active amplifying unit in a plurality of paths, and perform phase adjustment on the plurality of amplified microwave signals; and providing a power division and transmission unit, the power division and transmission unit being configured to combine, into a microwave signal, a plurality of phase-adjusted microwave signals outputted by the phase shifting unit and output the microwave signal; assembling the radiation unit, the active amplifying unit, the phase shifting unit and the power division and transmission unit together in sequence.

In the embodiments, after the radiation unit receives a microwave signal from the outside and before transmitting the microwave signal to the phase shifting unit, the active amplifying unit is configured to amplify the microwave signal, which can compensate for loss of the microwave signal after the microwave signal enters the phase shifting unit, thereby effectively increasing the gain of the antenna, increasing the gain-to-noise temperature ratio of the antenna and improving the performance of the antenna.

If the microwave signal collected by the radiation unit is transmitted to the active amplifying unit through spatial coupling, there will be transmission loss, and alignment accuracies between the radiation unit and the active amplifying unit are relatively high. In some embodiments, in order to reduce the transmission loss and alignment errors. In some embodiments, the method further includes: forming a microwave connection unit between the radiation unit and the active amplifying unit, wherein the microwave connection unit is configured to transmit, to the active amplifying unit through a conductor, the plurality of microwave signals outputted by the radiation unit.

Taking manufacturing of the antenna shown in FIG. 1 to FIG. 12 as an example, the method of manufacturing the antenna of the present disclosure specifically includes the following steps:

Step 1: making a second patch structure 7.

A PCB board with a thickness of 0.5 mm to 6.4 mm is taken as the seventh substrate 71, and the PCB board is pre-processed to form a copper layer with a thickness of 17 um, 35 um, 50 um or 70 um on the PCB board. After film-lamination, a photoresist is coated on the copper layer, and after exposing the photoresist, the photoresist is developed. $K_2CO_3$ solution can be used to develop the photoresist to obtain a photoresist pattern. The copper layer is etched using the photoresist pattern as a mask, and the copper layer can be etched with a $CuCl_2$ solution to obtain a plurality of second metal patterns 72 on the seventh substrate 71 to form a metal patch array.

Subsequently, a mechanical punching method can be used to form alignment holes on the seventh substrate 71 for positioning and fixing a patch structure.

Step 2: making a first patch structure 6.

A PCB board with a thickness of 0.5 mm to 6.4 mm is taken as the sixth substrate 61, and the PCB board is pre-processed to form a copper layer with a thickness of 17 um, 35 um, 50 um or 70 um on the PCB board. After film lamination, a photoresist is coated on the copper layer, and after exposing the photoresist, the photoresist is developed. $K_2CO_3$ solution can be used to develop the photoresist to obtain a photoresist pattern. The copper layer is etched using the photoresist pattern as a mask, and the copper layer can be etched with a $CuCl_2$ solution to obtain a plurality of first metal patterns 62 and a power divider on the sixth substrate 61, the plurality of first metal pattern 62 form a metal patch array.

Subsequently, a mechanical punching method can be used to form alignment holes on the sixth substrate 61 for positioning and fixing the patch structure.

The sixth substrate 61 is further provided with a via hole, the via hole is a metalized via hole, and the first male head 63 extends to a side of the sixth substrate 61 away from the seventh substrate 71 through the metalized via hole. When making the metalized via hole, the sixth substrate 61 is drilled mechanically or by laser first, then burrs in the hole are removed, and then slags in the hole are removed. Subsequently, copper is plated on a sidewalls of the via hole by a chemical method, a thickness of the copper is 300 nm to 1000 nm, and then the copper is thickened by electroplating, so that the thickness of the copper reaches 5 um to 25 um.

In a specific example, the second patch structure 7 may include an array of 32×32 metal patches, the first patch structure 6 may include an array of 32×32 metal patches, and the power divider of the first patch structure 6 is T-type or Wilkinson-type 16-in-1 power divider design, that is, each power divider is connected to a 4×4 metal patch array, so that the first patch structure 6 will output 8×8 microwave signals through the 64 first male heads 63.

Step 3: filling a prepreg between the first patch structure 6 and the second patch structure 7, using an alignment hole to align the first patch structure 6 and the second patch structure 7, and performing lamination and hot-lamination processes to fasten together the first patch structure 6 and the second patch structure 7.

Step 4: welding a first female head 51 of the microwave connector on a side of the first patch structure 6 away from the second patch structure 7. The first female head 51 corresponds to the first male head 63 in a one-to-one manner, and is welded together with the corresponding first male head 63.

Step 5: fabricating the active amplifier unit, and welding the second female head 43 of the active amplifier unit and the second male head 52 of the microwave connector together.

The active amplifying unit 4 includes a fifth substrate 41 and a plurality of active amplifying circuits 42 arranged in an array on the fifth substrate 41, and the active amplifying circuits 42 correspond with the microwave connectors in a one-to-one manner. Each active amplifying circuit includes: a radio frequency signal input terminal 47, configured to receive a microwave signal; a filter, connected to the radio frequency signal input terminal and configured to filter noise of an inputted microwave signal; at least one amplifier, connected to the filter and configured to amplify an intensity of an microwave signal; at least one attenuator, connected to an amplifier and configured to attenuate an intensity of the microwave signal; a radio frequency signal output terminal 48, connected to the attenuator and configured to transmit a microwave signal to the phase shifting unit 3 in a spatial coupling manner.

FIG. 8 is a circuit diagram of an active amplifier circuit 42, where Vdd is a direct-current supply voltage; $R_1$, $R_2$ are matching resistances; La, Lm, Ls, and Lg are matching inductances; $C_1$, $C_2$, $C_3$ are matching capacitors; $M_1$, $M_2$, $M_3$ are microwave transistors. The fifth substrate 41 may be a PCB board; the second female head 43, the above-mentioned capacitors, inductors, resistors and other components may be welded on the PCB board by a reflow soldering process to form an active amplifier unit 4, and metal wires may be formed on the PCB board by a patterning process.

The microwave signal outputted from the radio frequency signal output terminal 48 is led out by the metal wire 46. The fifth substrate 41 is further provided with a via hole 45. The metal wire 46 extends to a back surface of the fifth substrate 41 through a via hole 45 penetrating through the fifth substrate 41, and then the microwave signal is coupled between the metal delay line 34 and a coupling groove on the liquid crystal phase shifter. The via hole 45 is a metalized via hole. When making the metalized via hole, the fifth substrate 41 is drilled mechanically or by laser first, then burrs in the hole are removed, and then slags in the hole are removed. Subsequently, copper is plated on a sidewall of the via hole by a chemical method, a thickness of the copper is 300 nm to 1000 nm, and then the copper is thickened by electroplating, so that the thickness of the copper reaches Sum to 25 um.

Step 6: fabricating the phase shifting unit 3, and aligning the phase shifting unit 3 and the active amplifying unit 4 together.

The phase shifting unit 3 may be a liquid crystal phase shifter. The liquid crystal phase shifter includes a third substrate 31 and a fourth substrate 32 disposed oppositely, a metal ground electrode 33 of the liquid crystal phase shifter is provided on a surface of the third substrate 31 facing the fourth substrate 32, and a metal delay line 34 of the liquid crystal phase shifter is provided on a surface of the fourth substrate 32 facing the third substrate 31. The manufacturing method of the liquid crystal phase shifter further includes: forming a first alignment film on a surface of the third substrate 31 facing the fourth substrate 32, forming a second alignment film 37 on a surface of the fourth substrate 32 facing the third substrate 31 and forming a liquid crystal layer 35 between the first alignment film 37 and the second alignment film 36. A coupling groove of the metal ground electrode 33 can be rectangular, H-shaped, bone-shaped, etc., and a thickness of the metal ground electrode 33 can be 0.5 um to 5 um; the metal delay line 34 can be made of copper and arranged in a serpentine winding manner. The line width of the metal delay line is 100 um to 250 um, the line distance is 150 um to 400 um, and a thickness is 0.5 um to 5 um. Further, the liquid crystal phase shifter includes a bias line layer, which can be made of ITO, a line width of the bias line layer is 3 um to 20 um, and a thickness is 30 nm to 150 nm.

Specifically, the phase shifting unit 3 and the active amplifying unit 4 can be bonded together by a frame-sealing glue.

Step 7: making the power divider 2 and the waveguide 1, and fixing the power divider 2 and the waveguide 1 together by screws to form the power division and transmission unit 10.

A PCB board with a thickness of 0.5 mm to 6.4 mm is taken as the second substrate 21, and the PCB board is pre-processed to form a copper layer with a thickness of 17 um, 35 um, 50 um or 70 um on the PCB board. After film lamination, a photoresist is coated on the copper layer, and after exposing the photoresist, the photoresist is developed. $K_2CO_3$ solution can be used to develop the photoresist to obtain a photoresist pattern. The copper layer is etched using the photoresist pattern as a mask, and the copper layer can be etched with a $CuCl_2$ solution to obtain a wiring 24. The metal ground electrode 23 can be formed on the other side of the second substrate 21 using the same patterning method. A line width of the wiring 24 can be 80 um to 400 um, a thickness of the wiring can be 17 um, and a thickness of the metal ground electrode 23 can be 17 um. The metal ground pole 23 is provided with a coupling groove, and an available form of the coupling groove can be rectangular, H type, bone type, etc.

The M metal ground electrodes 23 are divided into N groups, and the metal ground electrodes 23 in each group are connected to a probe 22 through a wiring to collect the M/N microwave signals to the probe 22; the probe 22 extends to a side of the second substrate 21 away from the phase shifting unit 3 through the via hole penetrating through the second substrate 21. The via hole may be a metalized via. When making the metalized via hole, the second substrate 21 is drilled mechanically or by laser first, then burrs in the hole are removed, and then slags in the hole are removed. Subsequently, copper is plated on a sidewall of the via hole by a chemical method, a thickness of the copper is 300 nm to 1000 nm, and then the copper is thickened by electroplating, so that the thickness of the copper reaches Sum to 25 um.

The waveguide 1 can be made by electromechanical processing and welding methods. As shown in FIG. 11 and FIG. 12, the waveguide 1 includes N hollow waveguide cavities 12 corresponding to the probes 22 in a one-to-one manner, the probe 22 is inserted into a corresponding waveguide cavity 12, the N hollow waveguide cavities 12 are communicated to form an integrated structure, and the integrated structure is provided with an opening, and a signal output terminal 13 is disposed at the opening. The signal output terminal 13 can output microwave signals.

Step 8: aligning and bonding the power division and transmission unit 10 and the phase shift unit 3 together, where the power division transmission unit 10 is located on a side of the phase shift unit 3 away from the active amplifying unit 4.

Specifically, the power division and transmission unit 10 and the phase shifting unit 3 subject to the step 6 can be aligned and bonded together by a frame sealing glue.

The antenna of the embodiment can be obtained after the above steps.

In the embodiments, after the patch structure receives a microwave signal from the outside and before transmitting the microwave signal to the phase shifting unit, the active amplifying unit is configured to amplify the microwave signal, which can compensate for loss of the microwave signal after entering the phase shifting unit. It can effectively increase the gain of the antenna, thereby increasing the gain-to-noise temperature ratio of the antenna and improving the performance of the antenna. A plurality of microwave signals outputted by the patch structure is transmitted to the active amplifying unit through the microwave connection unit, which can reduce the transmission loss and reduce the alignment error. In the embodiment, feeding between the active amplifier circuit and the liquid crystal phase shifter is implemented in a coupling manner, which can avoid complicated processes such as punching and copper-filling on a substrate of the liquid crystal phase shifter, simplify the manufacturing process and reduce process complexity. The power divider transmission unit adopts a design of a PCB power divider and an aluminum waveguide, which combines an advantage of the PCB power divider in respect of easily-implemented planar processing and a characteristic of the aluminum waveguide in respect of an extremely low transmission loss, and can overcome a shortcoming of a single PCB power divider in respect of a high insertion loss and a shortcoming of a single aluminum waveguide in respect of difficult processes and high costs.

In each method embodiment of the present disclosure, numbers of the steps cannot be used to limit a sequence of the steps. For those ordinary skilled in the art, without paying creative work, a change in the sequence of the steps is also within the protection scope of the present disclosure.

Unless otherwise defined, technical or scientific terms used in the present disclosure shall have ordinary meanings understood by those of ordinary skill in the art to which the present disclosure belongs. The terms "first", "second", and the like used in this disclosure do not indicate any order, quantity, or importance, but are only used to distinguish different components. The terms "include", "have" or any variations thereof are intended to mean that an element or article preceding such a term encompasses an element or article following such a term, or equivalents thereof, without precluding other elements or articles. Expressions such as "connection" or "connected" are not limited to physical or mechanical connections, but may include electrical connections, whether direct connection or indirect connection. Terms "Up", "down", "left", "right", etc. are only used to indicate relative position relationship. When an absolute position of the described object changes, the relative position relationship may change accordingly.

It will be understood that when an element, such as a layer, film, area or substrate, is referred to as being "on" or "under" another element, it can be directly on or directly under the other element, or intervening elements may also be present.

Specific features, structures, materials or characteristics in the description of forgoing implementations may be combined in any one or more embodiments or examples in a proper manner.

The above descriptions merely describe specific implementations of the present disclosure, and the scope of the present disclosure is not limited thereto. Any modifications or substitutions easily occurring to a person of ordinary skill in the art without departing from the principle of the present disclosure shall fall within the scope of the present disclosure. Therefore, the protection scope of the present disclosure is defined by the protection scope of the claims.

The invention claimed is:

1. An antenna, comprising:

a radiation unit, configured to receive a microwave signal from outside and/or send a microwave signal to the outside, wherein the radiation unit comprises one patch structure or a plurality of patch structures, the one patch structure or each of the plurality of patch structures comprises a substrate and a plurality of metal patch arrays disposed on a surface of the substrate at one side of the substrate, and the substrate is a printed circuit board;

a phase shifting unit, configured to receive a plurality of first microwave signals from the radiation unit and perform phase adjustment on the plurality of first microwave signals; and a power division and transmission unit, configured to combine a plurality of phase-adjusted microwave signals outputted by the phase shifting unit into a microwave signal and output the microwave signal, wherein the power division and transmission unit comprises:

a power divider, configured to combine, into N microwave signals, M phase-adjusted microwave signals outputted by M phase shifting units, and output the N microwave signals to a waveguide, wherein M and N are integers greater than 1, and M is greater than N;

a waveguide, configured to combine the N microwave signals into a microwave signal and output the microwave signal.

2. The antenna according to claim 1, comprising:

an active amplifying unit, configured to receive a plurality of microwave signals inputted by the radiation unit, amplify the plurality of microwave signals, generate the plurality of first microwave signals, and send the plurality of first microwave signals to the phase shifting unit, wherein the plurality of first microwave signals are a plurality of amplified microwave signals.

3. The antenna according to claim 2, comprising:

a microwave connection unit, between the radiation unit and the active amplifying unit and configured to transmit the plurality of microwave signals outputted by the radiation unit to the active amplifying unit through a conductor.

4. The antenna according to claim 2, wherein, each of the plurality of metal patch arrays comprises a plurality of metal patterns disposed in an array; a first patch structure adjacent to the active amplifying unit further comprises at least one power divider, and each of the at least one power divider is connected to at least one of the plurality of metal patch arrays.

5. The antenna according to claim 4, wherein, a distance between adjacent metal patch arrays is not less than 0.52, and 2 is a width of each of the plurality of metal patch arrays.

6. The antenna according to claim 4, wherein, when the radiation unit comprises the plurality of patch structures, the plurality of patch structures are stacked, and adjacent patch structures are connected by prepregs or adhesive insulating spacers.

7. The antenna according to claim 6, wherein, the radiation unit comprises a first patch structure and a second patch structure stacked with the first patch structure, a plurality of first metal patch arrays is arranged on the first patch structure, a plurality of second metal patch arrays is arranged on the second patch structure, and the plurality of first metal patch arrays correspond to the plurality of second metal patch arrays in a one-to-one manner.

8. The antenna according to claim 7, wherein, each of the plurality of first metal patch arrays comprises a plurality of first metal patterns disposed in an array, each of the plurality of second metal patch arrays comprises a plurality of second metal patterns disposed in an array, the plurality of first metal patterns correspond to the plurality of second metal patterns in a one-to-one manner, and an orthographic projection of a center of each of the plurality of first metal patterns on a substrate of the second patch structure coincides with a center of a corresponding second metal pattern.

9. The antenna according to claim 4, wherein, the active amplifying unit comprises a plurality of active amplifying circuits, and each of the plurality of active amplifying circuits comprises:

a radio frequency signal input terminal, configured to receive a microwave signal;

a filter, connected to the radio frequency signal input terminal and configured to filter noise of an input microwave signal;

at least one amplifier, connected to the filter and configured to amplify an intensity of a microwave signal;

at least one attenuator, connected to an amplifier and configured to attenuate an intensity of a microwave signal;

a radio frequency signal output terminal, connected to an attenuator and configured to transmit a microwave signal to the phase shifting unit in a spatial coupling manner.

10. The antenna according to claim 9, wherein, when the antenna comprises the microwave connection unit, the microwave connection unit comprises a plurality of microwave connectors, each of the plurality of microwave connectors comprises a second male head and a first female head connected to each other; the first female head is connected to a first male head of a power divider of the first patch structure in a one-to-one correspondence, and the second male head is connected to a second female head of an active amplifier circuit in a one-to-one correspondence.

11. The antenna according to claim 1, wherein, the phase shifting unit is a liquid crystal phase shifter.

12. The antenna according to claim 1, wherein, the power divider comprises a metal ground electrode corresponding to the phase shift unit in a one-to-one manner, and the metal ground electrode is provided with a coupling groove configured to couple a microwave signal between the phase shifting unit and the coupling groove; M metal ground electrodes are divided into N groups, and each group of metal ground electrodes is connected to a probe through a wire;

the waveguide comprises N hollow waveguide cavities corresponding to probes in a one-to-one manner, the probe is inserted into a corresponding waveguide cavity, the N hollow waveguide cavities are communicated to form an integrated structure, and the integrated structure is provided with an opening, and a signal output terminal is disposed at the opening.

13. The antenna according to claim 1, wherein, the waveguide is an aluminum waveguide.

14. An antenna system, comprising:

the antenna, wherein the antenna comprises:

a radiation unit, configured to receive a microwave signal from outside and/or send a microwave signal to the outside, wherein the radiation unit comprises one patch structure or a plurality of patch structures, the one patch structure or each of the plurality of patch structures comprises a substrate and a plurality of metal patch arrays disposed on a surface of the substrate at one side of the substrate, and the substrate is a printed circuit board;

a phase shifting unit, configured to receive a plurality of first microwave signals from the radiation unit and perform phase adjustment on the plurality of first microwave signals; and a power division and transmission unit, configured to combine a plurality of phase-adjusted microwave signals outputted by the phase shifting unit into a microwave signal and output the microwave signal, wherein the power division and transmission unit comprises:

a power divider, configured to combine, into N microwave signals, M phase-adjusted microwave signals outputted by M phase shifting units, and output the N microwave signals to a waveguide, wherein M and N are integers greater than 1, and M is greater than N;

a waveguide, configured to combine the N microwave signals into a microwave signal and output the microwave signal.

15. A method of manufacturing an antenna, comprising:

providing a radiation unit, the radiation unit being configured to receive a microwave signal from outside and/or send a microwave signal to the outside, wherein the radiation unit comprises one patch structure or a plurality of patch structures, the one patch structure or each of the plurality of patch structures comprises a substrate and a plurality of metal patch arrays disposed on a surface of the substrate at one side of the substrate, and the substrate is a printed circuit board;

providing a phase shifting unit, the phase shifting unit being configured to receive a plurality of first microwave signals from the radiation unit, and perform a phase adjustment on the plurality of first microwave signals; and providing a power division and transmission unit, the power division and transmission unit being configured to combine, into a microwave signal, a plurality of phase-adjusted microwave signals outputted by the phase shifting unit and output the microwave signal, wherein the power division and transmission unit comprises:

a power divider, configured to combine, into N microwave signals, M phase-adjusted microwave signals outputted by M phase shifting units, and output the N microwave signals to a waveguide, wherein M and N are integers greater than 1, and M is greater than N;

a waveguide, configured to combine the N microwave signals into a microwave signal and output the microwave signal.

16. The method of manufacturing the antenna according to claim 15, further comprising:

providing an active amplifying unit, the active amplifying unit being configured to receive a plurality of microwave signals inputted by the radiation unit, amplify the plurality of microwave signals, generate the plurality of first microwave signals, and send the plurality of first microwave signals to the phase shifting unit, wherein the plurality of first microwave signals are a plurality of amplified microwave signals; and assembling the radiation unit, the active amplifying unit, the phase shifting unit and the power division and transmission unit together in sequence.

17. The method of manufacturing the antenna according to claim 16, comprising:

forming a microwave connection unit between the radiation unit and the active amplifying unit, wherein the microwave connection unit is configured to transmit, to the active amplifying unit through a conductor, the plurality of microwave signals outputted by the radiation unit.

18. The method of manufacturing the antenna according to claim 16, wherein each of the plurality of metal patch arrays comprises a plurality of metal patterns disposed in an array; a first patch structure adjacent to the active amplifying unit further comprises at least one power divider, and each of the at least one power divider is connected to at least one of the plurality of metal patch arrays.

19. The method of manufacturing the antenna according to claim 18, wherein a distance between adjacent metal patch arrays is not less than 0.5λ, and λ is a width of each of the plurality of metal patch arrays.

* * * * *